(12) United States Patent
Conti

(10) Patent No.: US 7,902,306 B2
(45) Date of Patent: Mar. 8, 2011

(54) POLYOLEFIN PRODUCTION USING HIGH OLEFIN CONCENTRATION

(75) Inventor: Giacomo Conti, Maurage (BE)

(73) Assignee: Total Petrochemicals Research Feluy, Seneffe (Feluy) (BE)

(*) Notice: Subject to any disclaimer, the term of this patent is extended or adjusted under 35 U.S.C. 154(b) by 0 days.

(21) Appl. No.: 12/605,614

(22) Filed: Oct. 26, 2009

(65) Prior Publication Data

US 2010/0144982 A1 Jun. 10, 2010

Related U.S. Application Data

(60) Continuation of application No. 11/499,042, filed on Aug. 1, 2006, now abandoned, and a continuation of application No. 12/243,346, filed on Oct. 1, 2008, now abandoned, which is a division of application No. 11/057,715, filed on Feb. 14, 2005, now abandoned.

(60) Provisional application No. 60/544,846, filed on Feb. 13, 2004.

(30) Foreign Application Priority Data

Feb. 13, 2004 (EP) ..................... 04100575

(51) Int. Cl.
*C08F 2/00* (2006.01)
*G05D 16/00* (2006.01)
*G01N 7/00* (2006.01)

(52) U.S. Cl. ........... 526/61; 526/64; 73/64.45; 73/64.46; 73/19.05; 422/112

(58) Field of Classification Search .............. 526/61, 526/64; 73/19.05, 64.45, 64.46
See application file for complete search history.

(56) References Cited

U.S. PATENT DOCUMENTS

| 3,257,362 A * | 6/1966 | Norwood ............... 526/61 |
| 3,293,000 A * | 12/1966 | Marwil ............... 422/132 |
| 2005/0272891 A1* | 12/2005 | Fouarge et al. ........ 526/943 |
| 2007/0060723 A1* | 3/2007 | Conti ............... 526/64 |

* cited by examiner

*Primary Examiner* — Fred M Teskin
*Assistant Examiner* — Elizabeth Eng
(74) *Attorney, Agent, or Firm* — Tenley R. Krueger

(57) ABSTRACT

Methods for polymerization of an olefin monomer and polymers formed therefrom are described herein. The methods generally include introducing an olefin monomer and a diluent carrier liquid into a polymerization reactor, supplying at least one polymerization catalyst system to said polymerization reactor, circulating said diluent liquid in said olefin monomer within said reactor while polymerizing said olefin monomer in the presence of said catalyst system to produce a slurry of polymer fluff particle in said diluent carrier liquid, recovering polymer particles from said polymerization reactor, initiating a localized pressure drop in said reactor to produce a pressure wave in which the pressure varies with time, measuring said pressure wave and characterizing said pressure wave as either a hydraulic pressure curve or a non-hydraulic pressure curve, which is characteristic of a gas being present in said slurry and in response to the characteristic of said pressure curve as being a non-hydraulic pressure curve, reducing the olefin monomer concentration in said reactor.

17 Claims, 2 Drawing Sheets

POLYOLEFIN PRODUCTION USING HIGH OLEFIN CONCENTRATION

This application is a continuation of application Ser. No. 11/499,042, filed Aug. 1, 2006, now abandoned, and a continuation of application Ser. No. 12/243,346, filed Oct. 1, 2008, now abandoned, which is a division of application Ser. No. 11/057,715, filed Feb. 14, 2005, now abandoned, which claims the benefit of U.S. Provisional Application No. 60/544,846, filed Feb. 13, 2004.

The present invention concerns an improved method for polymerising olefins in order to prepare polyolefins, in particular for polymerising ethylene. The method is advantageous, since it allows control of the polymerisation reaction at higher olefin monomer concentration than in known processes, which in turn allows greater polyolefin production per unit volume of reactor. The invention further concerns the equipment set up used for performing the method of the invention.

For many years it has been desirable to increase the efficiency of polyolefin production. One goal has been to increase the quantity of polyolefin that can be produced in a given volume of reactor. The higher the quantity that can be produced, the lower the cost of product production, which provides clear market advantages.

One method for increasing the quantity of product produced per unit volume of reactor is to increase the concentration of the monomer in the reactor. Clearly, the greater the concentration of the monomer, the greater the concentration of the final product in the reactor. However, there are a number of problems associated with increasing the monomer concentration, as discussed below.

Generally, polymerisation of olefin monomers is an exothermic reaction. The reaction follows first order kinetics. Thus, the higher the monomer concentration, the faster the reaction proceeds, and the greater the quantity of heat that is released by the reaction process. This heat production may be extremely dangerous if it is not controlled. Clearly a build-up of heat in a reactor containing flammable hydrocarbons may lead to fires or explosions.

In order to solve this problem and to use as high a monomer concentration as possible, typically two measures have been taken in the past. Firstly, olefin polymerisation reactors have been carefully designed to control the surface area:volume ratio of the reactor. This ensures that there is sufficient surface area to the reaction vessel to allow heat exchange with the outer environment, thus reducing the temperature inside the reactor. Single or double loop reactors are common. These reactors consist of a long pipe, arranged in one or two loops, each loop being tens of meters high. The diameter of the pipes is typically around 60 cm. Such an arrangement has a large surface area:volume ratio as compared with a conventional flask or tank arrangement. Secondly, the reactors are usually jacketed with a cooling system, such as with a water jacket. This serves to efficiently carry away heat from the surface of the reactor, to increase the efficiency of cooling.

However, generally these methods have only been suitable for monomer concentrations of from 4-6.5 wt %. This is because a further problem exists with increasing monomer concentration. Often the monomer is gaseous at the temperatures and pressures employed in the reaction. At elevated concentrations of the monomer, the monomer may pass out of solution and form pockets of gas in the reactor. This has clear disadvantages. The gas formed can lead to dangerous pressure build-up. In addition, the release of monomer from the solvent reduces the monomer available for reaction, unbalancing the carefully selected concentration of reactants and leading to undesirable products and impurities. This may have the effect of reducing the efficiency of the process rather than increasing it. Finally, the reactants are typically pumped around the reactor loop for efficient mixing and cooling, but the pumps are designed to pump liquids and will not function properly if gas is present.

It is an aim of the present invention to solve the problems associated with known methods, as discussed above. Thus, the present invention seeks to provide an improved method for polymerising olefins, and in particular for producing polyethylene or polypropylene.

Accordingly, the present invention provides a method for polymerising an olefin, which method comprises the following steps:
 (a) polymerising an olefin monomer in a reactor, at a selected olefin monomer concentration in a solvent;
 (b) measuring a pressure curve in the reactor to determine whether the pressure curve is characteristic of a hydraulic system or a non-hydraulic system; and
 (c) if the pressure curve is characteristic of a non-hydraulic system, reducing the olefin monomer concentration in the reactor.

In the context of the present invention, pressure curve means a pressure curve that is deliberately created by initiating a pressure drop. That may be effected by any means, but typically by exposing at least a small part of the reactor to the surroundings for a selected period of time. It is particularly preferred that the pressure drop is initiated by removing product from the reactor. Measurement thus involves recording the change in pressure in the reactor over a specific period of time. These measurements result in a pressure curve, showing the change in pressure over time. If a gas is present, this pressure curve will have a non-hydraulic characteristic. However, if no gas is present, this will be a hydraulic characteristic.

The method of the present invention is particularly advantageous, since it allows larger quantities of polymer to be produced in the same reactor, without the need to limit the olefin concentration in the reactor in the restricted way in prior art methods. Typically up to double the olefin concentration can be achieved in the present methods, as compared with prior art methods. Polyolefins can be produced more efficiently by this method, at lower cost, leading to a significant market advantage.

To put the present method in context, a typical process for producing the polymer powder will first be described. Such a process generally employs a turbulent flow reactor such as a continuous pipe reactor in the form of a loop. However, other types of reactors such as stirred reactors may be used.

Polymerisation is carried out in a loop reactor in a circulating turbulent flow. A so-called loop reactor is well known and is described in the Encyclopaedia of Chemical Technology, $3^{rd}$ edition, vol. 16 page 390. This can produce LLDPE (linear low density polyethylene) and HDPE (high density polyethylene) resins in the same type of equipment. A loop reactor may be connected in parallel or in series to one or more fluffier reactors, such as another loop reactor. A loop reactor that is connected in series or in parallel to another loop reactor may be referred to as a "double loop" reactor.

In a double loop reactor the process is a continuous process. A monomer (e.g. ethylene polymerises in a liquid diluent (e.g. isobutene) in the presence of a comonomer (e.g. hexene), hydrogen, catalyst, and activating agent. The slurry is maintained in circulation by an axial pump consisting in a reactor essentially of vertical jacketed pipe sections connected by trough elbows. The polymerisation heat is extracted by a water cooling jacket. The reactor line includes two double loop reactors that can be used in parallel or in series. The approximate volume of the reactors may be about 100 m$^3$. Monomodal grades are produced with the parallel or series configuration and bimodal grades are produced with the series configuration.

The product (e.g. polyethylene) is taken out of the reactor with some diluent through settling legs and discontinuous discharge valves. A small fraction of the total circulating flow is withdrawn. It is moved to a polymer degassing section in which the solid content is increased.

While being depressurised, the slurry is transferred through heated flash lines to a flash tank. In the flash tank, the product and diluent are separated. The degassing is completed in a purge column. A conveyor drying unit may be employed before the purge column in some instances The powder product is transported under nitrogen to fluff silos and extruded into pellets along with some specific additives. A pellet treatment unit comprising silos and hot and cool air flows allows the removal of residual components from the pellets. The pellets then are directed to homogenisation silos before final storage.

This embodiment of the double loop reactor process is usable with chromium type, Ziegler-Natta-type and metallocene-type catalysts. Each catalyst type would have a specific injection system.

It will be seen from the above that the present invention relates to control of the polymerisation reaction in the production process.

The present invention will now be described in more detail by way of example only with reference to the following Figures, in which.

The pressure curve can be measured using a pressure meter of any standard type. The pressure meter may be connected to the reactor by any means, such as via a connection pipe comprising a valve. Preferably it is installed in the ethylene feed line at the entrance of the reactor. Alternatively, a Dynisco® type transmitter can be placed in the reactor itself in order to better represent the pressure status inside the reactor. The valve may be opened or closed to initiate and end the pressure drop process which gives rise to the pressure curve. Preferably the valve is electronically controlled. Typically, the pressure is continuously measured; this allows the time between discharges through the discharge valves to be controlled in addition to providing the data necessary to identify the pressure drop after a discharge as hydraulic or non-hydraulic.

In a preferred embodiment, the pressure drop is only initiated when the pressure in the reactor reaches a certain threshold pressure. This threshold pressure may be selected depending on the nature of the reactants, the temperature in the reactor, the monomer concentration, and other characteristics of the reaction system (e.g. choice of catalyst, choice of solvent). These factors all have an influence on the solubility of the reactants, which affects the desired pressure, and are well known in the art. The type of reactor employed may also influence this choice if desired. For instance, a reactor that is taller needs more pressure at the bottom, because the pressure at the top will be lower. Typically a threshold pressure of 35-50 Bar is employed, more preferably from 38-45 Bar and most preferably from 40-43 Bar. A pressure of approximately 43 Bar is particularly preferred. 40-43 bar, is desirable in a preferred process, using isobutane as a solvent, but other pressures may be appropriate depending on reactants and solvent. Either in addition to this, or as an alternative, pressure drop measurements may be made at a desired time, or point in the process, or simply over regular time periods. The nature of the process and apparatus will determine the frequency and timing of pressure drop measurements.

Figure 1:
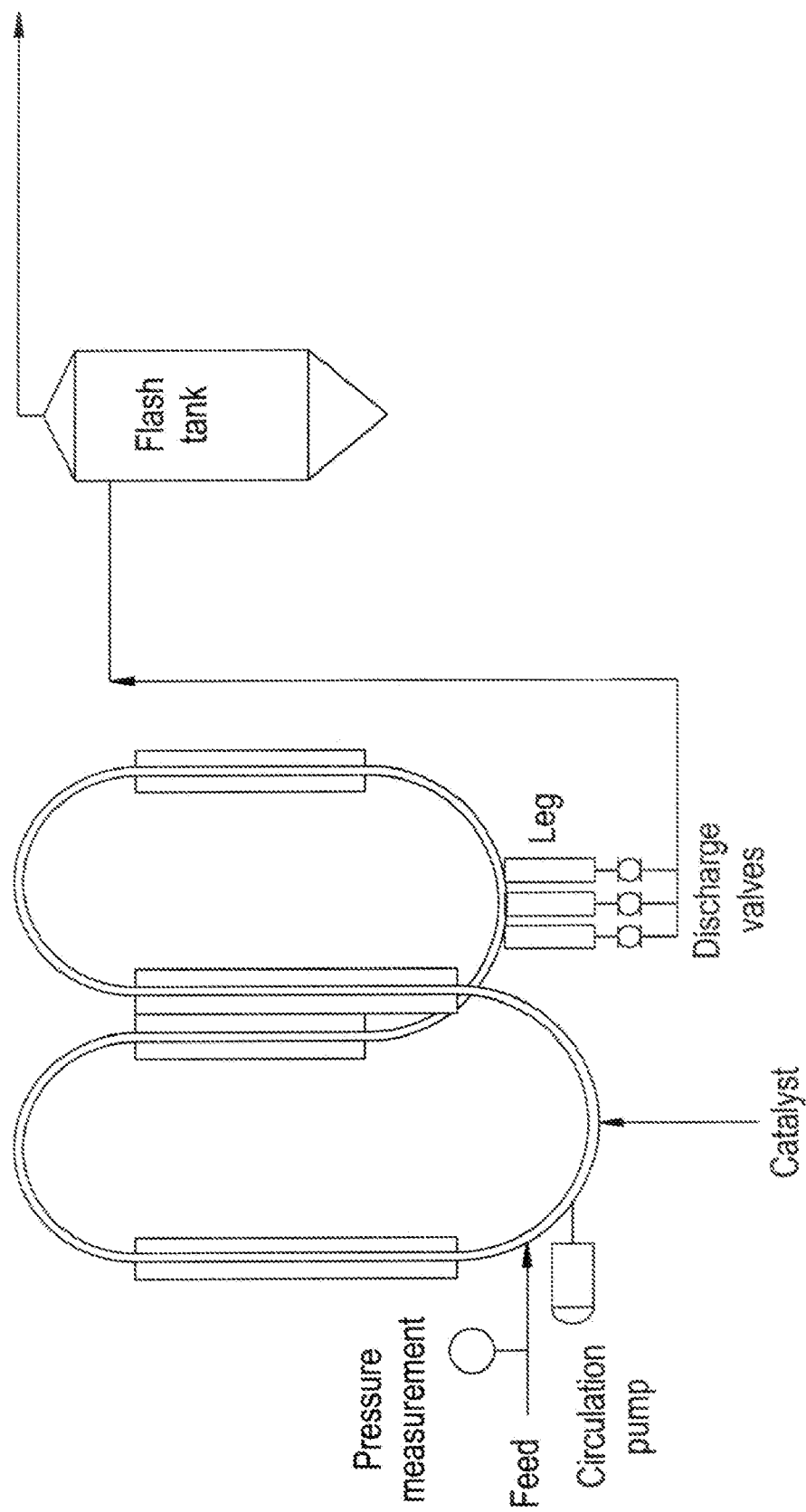
FIG. 1 shows a diagram of a double loop reactor with a pressure monitoring means attached.
Figure 2:
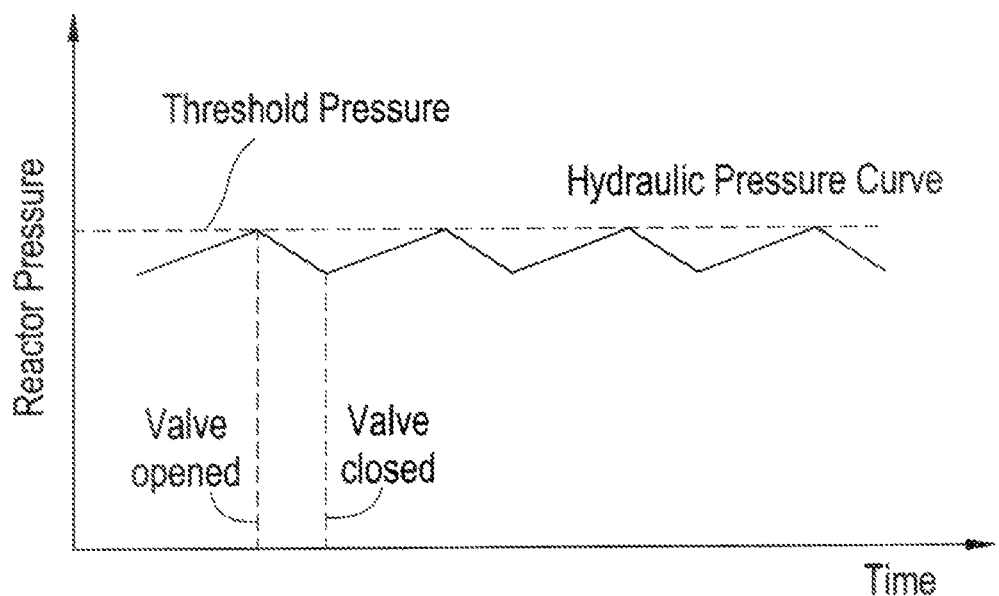
FIG. 2 shows an example of a hydraulic pressure curve.
Figure 3:
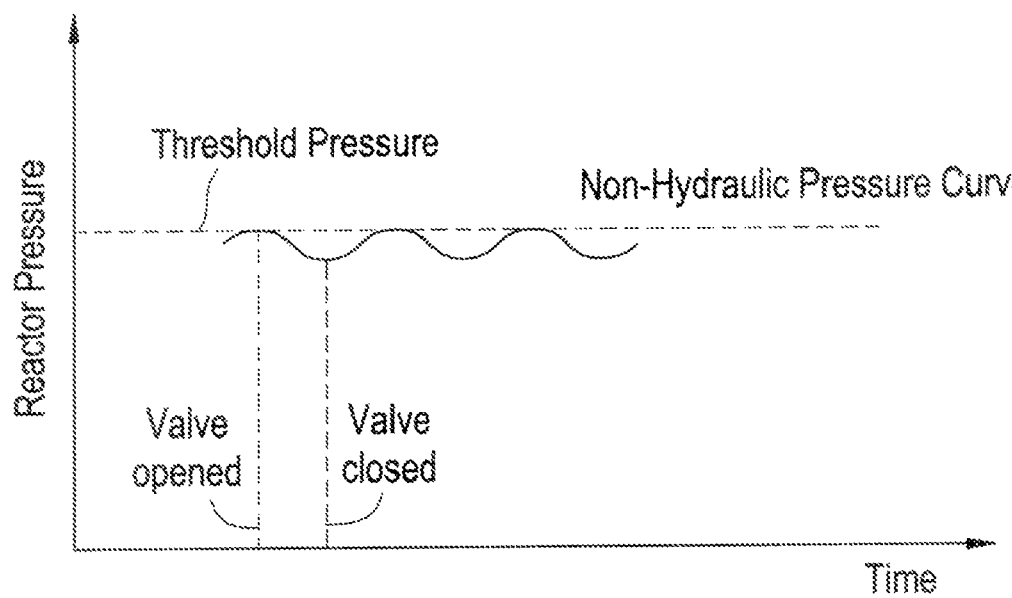
FIG. 3 shows an example of a non-hydraulic pressure curve.

Generally the pressure drop is initiated by opening a valve to remove product from the reactor. Since product must be removed from the reactor at periodic intervals (after it collects in the settling legs), and since there is inevitably a pressure drop at this time, then it is often most convenient to initiate the pressure drop by removing product, rather than introducing a separate pressure drop initiation. In a typical embodiment according to the present invention, the valve opens intermittently with a frequency of from 4 to 7 seconds and for a length of time of less than 5 seconds, allowing for a pressure drop of from 0.5 to 1.5 bars, preferably, of about 1 bar. The valve itself has a diameter of from 4 to 8 cm. (see FIGS. 2 and 3).

In the present invention, it is important to distinguish between a hydraulic pressure curve and a non-hydraulic pressure curve. A hydraulic pressure curve is characteristic of a liquid system wherein the liquid is non-compressible, whereas a non-hydraulic pressure curve is characteristic of a system containing at least some gas. The shapes of these curves are distinctive, and measuring a pressure curve for a pressure drop as defined above will allow the determination of whether the system comprises any gaseous products. The nature of hydraulic and non-hydraulic systems is well known in the art allowing ready identification of which system is present from the measured pressure curve. The shape of the pressure curve allows the distinction between hydraulic and non-hydraulic systems to be determined. Thus, in a non-hydraulic system the shape of the pressure curve is much smoother and there are less pressure variations when product discharge from the reactor occurs, since the gas that is present acts as a damper (see FIGS. 2 and 3). It will be clear from these Figures that the pressure curve is preferably identified as characteristic of a non-hydraulic system if the curve is not a saw-toothed type curve.

In the present invention the selected monomer concentration is higher than in known methods. Typically, the selected monomer concentration ranges from 7-15 wt. %. More preferably, the selected monomer concentration ranges from 10-12 wt. %, and most preferably from 11-12 wt %. The concentration is maintained as high as possible using the present method. Monomer concentration may be selected initially at a desired level, and maintained at that level over the course of the traction. Preferably, the pressure curve is continuously monitored. However, in some embodiments the pressure curve may be measured after a certain time, and/or if the pressure reaches a certain threshold. The monomer concentration may be reduced, maintained or increased as desired, based upon the results of the pressure curve monitoring or measurement. If desired, a feedback mechanism may be employed to automate the control of the monomer concentration.

The temperature employed in the reactor is not particularly limited, and may be selected depending upon the reactants employed, the reactor vessel and the monomer concentration, amongst other factors. Preferably, however, the temperature employed for polymerisation ranges from 70-120° C. More preferably the temperature employed ranges from 80-110° C.

The solvent employed in the process is not especially limited, provided that it is suitable for polymerising the chosen monomer under the selected reaction conditions. Preferably the solvent comprises butane and/or hexane, especially for the polymerisation of ethylene or propylene. The temperature has an influence on the solubility of the reactants and in general solubility will be higher at lower temperatures. Thus the choice of temperature and solvent is typically taken in combination.

In a particularly preferred embodiment of the invention, the olefin monomer is selected from ethylene and propylene.

The present invention also provides an apparatus for polymerising an olefin monomer, which apparatus comprises the following:

(a) a reactor for polymerising the olefin monomer;
(b) a means for measuring the presence of gas in the reactor; and
(c) a means for controlling the concentration of Olefin monomer in the reactor;

wherein, the means for measuring the presence of gas in the reactor is a means capable of measuring a pressure curve in the reactor to determine whether the pressure curve is characteristic of a hydraulic system or a non-hydraulic system.

As mentioned above, the pressure measurement may be automated and may feed back to the means for controlling the monomer concentration. Thus, after a certain period of time, or at a threshold pressure in the reactor, the pressure curve is measured. The results of this measurement may be fed into an electronic system for controlling monomer concentration, which may prevent or slow the introduction of monomer into the reactor, or may increase the introduction, as desired.

Preferably, the means for measuring the presence of gas in the reactor comprises a pressure meter and a valve for releasing pressure in the reactor.

The invention claimed is:

1. A method for polymerization of an olefin monomer in a reactor system:
   a) introducing an olefin monomer and a diluent carrier liquid into a polymerization reactor;
   b) supplying at least one polymerization catalyst system to said polymerization reactor, circulating said olefin monomer in said diluent liquid within said reactor while polymerizing said olefin monomer in the presence of said catalyst system to produce a slurry of polymer fluff particles in said diluent carrier liquid;
   c) recovering polymer particles from said polymerization reactor;
   d) initiating a localized pressure drop in said reactor to produce a pressure wave in which the pressure varies with time;
   e) measuring said pressure wave and characterizing said pressure wave as either a hydraulic pressure curve or a non-hydraulic pressure curve which is characteristic of a gas being present in said slurry; and
   f) in response to the characteristic of said pressure curve as being a non-hydraulic pressure curve, reducing the olefin monomer concentration in said reactor.

2. The method of claim 1, wherein said reactor is a loop-type reactor and said localized pressure drop in said reactor is initialized when the pressure within said reactor reaches a threshold pressure of 35-50 bar.

3. The method of claim 1, wherein said pressure wave is initiated by intermittently opening a valve in a conduit leading to the interior of said reactor at a frequency within the range of 4-7 seconds.

4. The method of claim 1, wherein said localized pressure drop is within the range of 0.5-1.5 bars.

5. A method for the polymerization of an olefin monomer in a loop reactor system comprising:
   a) introducing an olefin monomer and a diluent carrier liquid into a reactor system comprising at, least one loop reactor;
   b) supplying a polymerization catalyst system to said reactor system;
   c) circulating said diluent liquid and said olefin monomer through said loop reactor while polymerizing said olefin monomer in the presence of said catalyst system to produce a slurry of polymer fluff particles in said diluent carrier liquid;
   d) initiating a localized pressure drop in said reactor to produce a pressure wave in which the pressure varies with time;
   e) measuring said pressure wave and characterizing said pressure wave as either a hydraulic pressure curve or a non-hydraulic pressure curve which is characteristic of a gas being present in said slurry; and
   f) in response to the characterization of said curve as being a non-hydraulic pressure curve, reducing the olefin monomer concentration in said reactor.

6. The method of claim 5 further comprising diverting the flow of said slurry through said loop reactor into at least one settling leg connected to said loop reactor and having a valve therein and wherein said pressure drop is initiated by intermittently opening said valve to withdraw a settled polymer slurry from said at least one settling leg.

7. The method or claim 6 wherein said settling leg valve is opened at a frequency within the range of 4-7 seconds.

8. The method of claim 5 wherein the monomer concentration in said diluent liquid is within the range of 7-15 weight percent.

9. The method of claim 8 wherein said monomer concentration is within the range of 10-12 weight percent.

10. The method of claim 5 wherein said olefin monomer is selected from the group consisting of ethylene and propylene.

11. The method of claim 5 wherein said monomer is ethylene.

12. The method of claim 11 further comprising introducing a co-monomer into said reactor system to produce a copolymer of said ethylene and said co-monomer.

13. The method of claim 5 wherein said pressure curve is characterized as a hydraulic pressure curve when said pressure curve has sharp inflections at maximum and minimum pressure amplitudes to provide a saw-toothed type curve and said pressure curve is characterized as a non-hydraulic pressure curve when said pressure curve has gradual inflections at maximum and minimum pressure amplitudes in the nature of a sinusoidal type curve.

14. The method of claim 5, wherein said loop reactor is operated at a temperature within the range of 70°-120° C.

15. The method of claim 14 when said loop reactor is operated at a temperature within the range of 80°-110° C.

16. The method of claim 5, wherein said monomer is ethylene which is supplied to said loop reactor through an ethylene feed line and further comprising measuring said pressure wave by a pressure meter located in said ethylene feed line.

17. The method of claim 5, wherein said olefin monomer is selected from the group consisting of ethylene and propylene and said diluent carrier liquid is selected from the group consisting butane, isobutane, and hexane.

* * * * *